Aug. 22, 1933.　　　W. ALBERS　　　1,923,181
VEHICLE HEADLIGHT
Filed Jan. 15, 1931　　　4 Sheets-Sheet 1
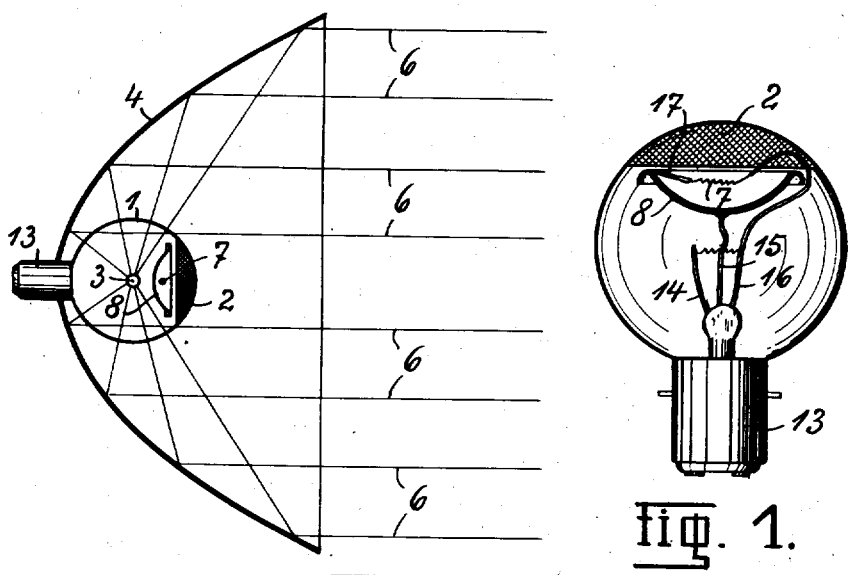
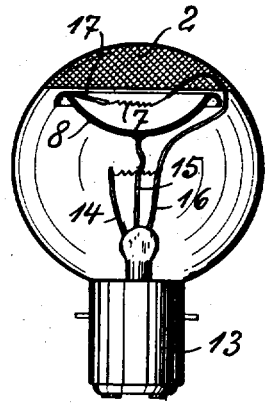
Fig. 1.
Fig. 2.
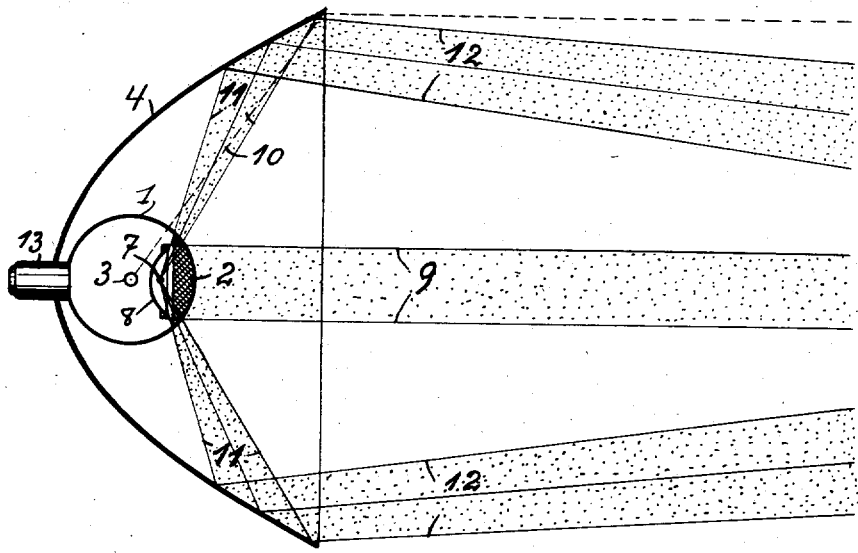
Fig. 3.

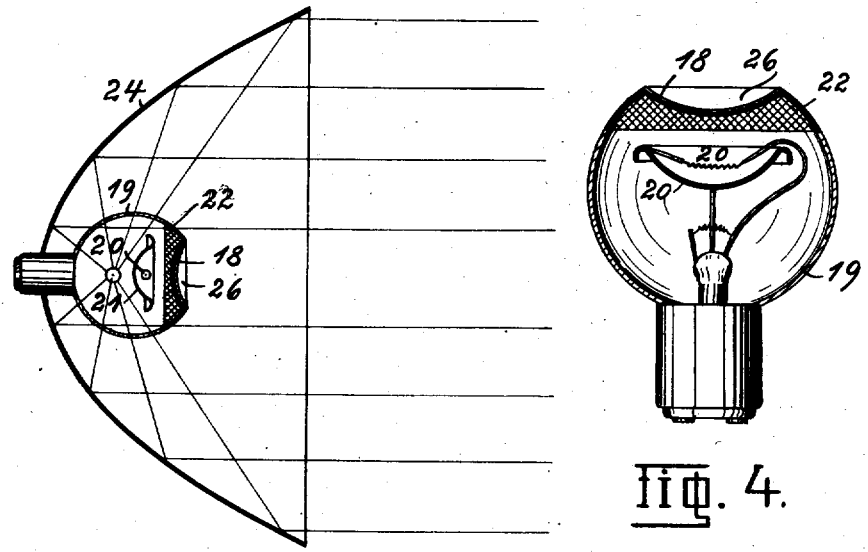
Fig. 4.
Fig. 5.
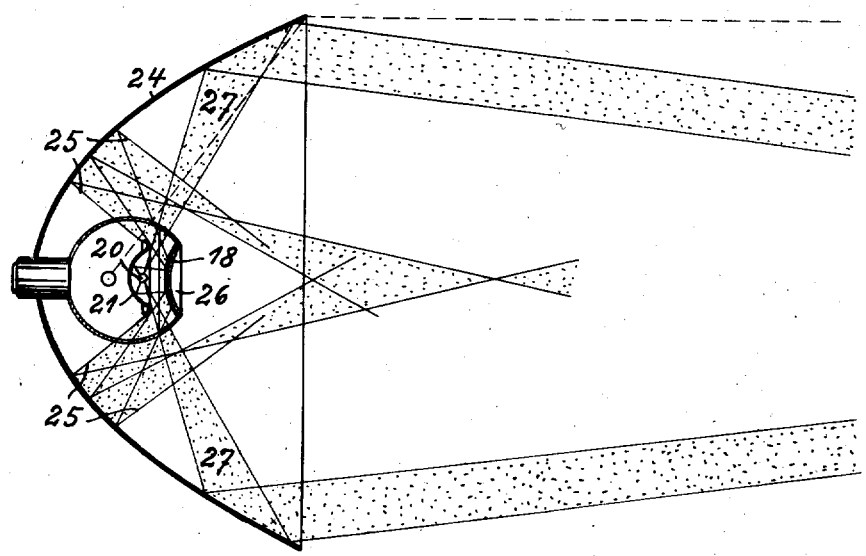
Fig. 6.

Aug. 22, 1933.　　　W. ALBERS　　　1,923,181
VEHICLE HEADLIGHT
Filed Jan. 15, 1931　　　4 Sheets-Sheet 4

Patented Aug. 22, 1933

1,923,181

UNITED STATES PATENT OFFICE 1,923,181

VEHICLE HEADLIGHT

Willi Albers, Breslau, Germany

Application January 15, 1931, Serial No. 508,887, and in Germany July 21, 1930

3 Claims. (Cl. 240—41.25)

This invention relates to electric multiple filament incandescent lamps for the headlights on motor cars. Whereas the main filament radiates the known white headlight light, the portion of the glass bulb surrounding the auxiliary incandescent filament has a preferably yellow color for dimming purposes because yellow light has been found more agreeable to the eyes. In known lamps of this type either the dimmed light projected from the auxiliary filament is too feeble and does not give the driver a sufficiently clear vision of the dark road or a mixing of the white and yellow light takes place, for example owing to unimpeded rearward projection of the auxiliary filament into the reflector. In this manner a disturbing twilight is produced which is useless for motor vehicles.

The main object of the invention is to produce with the auxiliary filament of an incandescent lamp fixed in the casing of the headlight a greater utilization of light in that the greatest portion of its preferably colored dimmed light passes into the headlight reflector and therefrom on to the road. For this purpose an auxiliary reflector is arranged between the main and auxiliary filaments, which auxiliary reflector allows the main filament to flood the headlight reflector with white light from the focus of the headlight reflector. This auxiliary reflector, however, also leaves free at least one more or less wide zone for the flooding of the headlight reflector with colored light projected by the auxiliary filament through the colored or ground glass portion of the spherical bulb, avoiding a mixing of the two kinds of light. Thus, a bright dimmed light will be obtained.

It is, however, often desired, when travelling at night, to project dimmed light almost in the same strength as the white light of the headlight, in order to better recognize distant objects with the dimmed light.

With a view, therefore, to allowing the auxiliary filament to act similarly to the main filament situated in the focus of the headlight reflector, the auxiliary filament is arranged in suitable manner very near to the focus of the headlight reflector and therefore to the main filament, an auxiliary reflecting, for example in the shape of a plate being provided between the two filaments. These two filaments, when switched in, should flood the entire headlight reflector. In order, nevertheless, to prevent the rays from the main and auxiliary filaments from shining at the same time through the different dimmed or colored zones of the bulb, the spherical bulb is preferably provided with a narrowed portion on the border line between the two zones, projecting inwardly towards the auxiliary reflector arranged between the two filaments. The bulb has therefore a shape similar to the known construction made of two united chambers. A very efficient far reaching and lateral effect of the projected light rays is attained with the auxiliary filament in this double chamber incandescent lamp, owing to the fact that this filament, besides being arranged near the main filament, is perpendicular to the auxiliary reflector.

In order to prevent the two sorts of light from simultaneously passing on to the headlight reflector, the plate reflector may also be provided with a rim, which retains the rays of the main and auxiliary filaments within the limits of their clear and dulled or colored zones respectively.

Three embodiments of the invention are illustrated by way of example in the accompanying drawings, in which:

Fig. 1 is an elevation of a bulb without headlight reflector.

Fig. 2 is a similar view with parabolic or auxiliary reflector and showing the path of the rays when projecting white light.

Fig. 3 is a similar view to Fig. 2, showing the path of the dimmed colored light.

Figs. 4 to 6 are similar views to Figs. 1 to 3 of a second form of construction.

Figs. 7 and 8 show a third form of construction, Fig. 7 being an elevation of the headlight with the main filament switched in, whereas in Fig. 8 the auxiliary filament is switched in.

Figure 7:
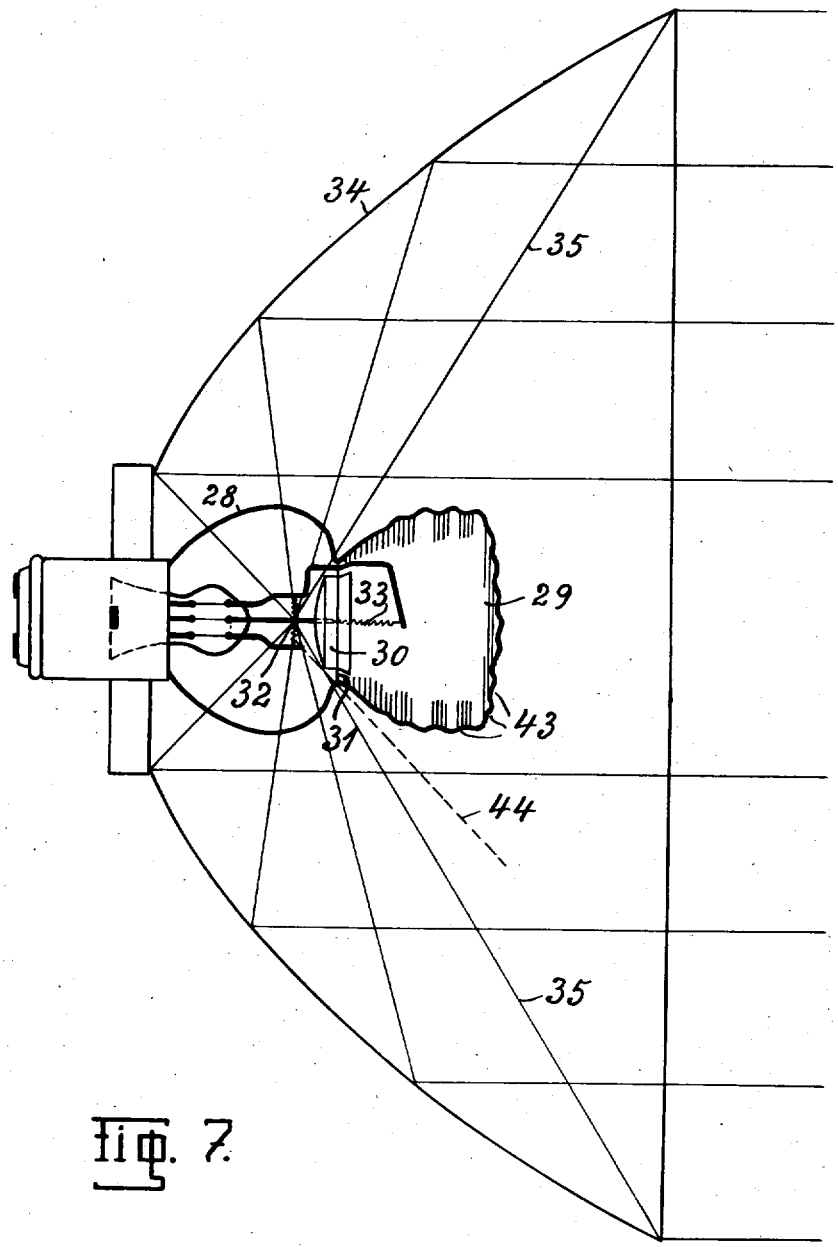

In the first form of construction shown in Figs. 1 to 3, the outer calotte 2 of the lamp bulb 1 is colored, whereas the remaining portion is of clear glass. The coloring of the calotte 2 or of some other portion of the lamp bulb can be effected by flashed glass, by dulling, by a dipping process or by applying colored layers. It is evident that the word "colored" covers all suitable colors, but yellow or orange have been found preferable.

A multiple filament lamp is employed, the rear main filament 3 of which can only shine through the clear glass of the bulb 1, whereas the auxiliary filament 7 can only shine through the colored calotte 2. The auxiliary reflector 8 employed for this purpose may be flat or curved and made of translucent colored material or be opaque. In the example illustrated, it is formed of a small parabolic mirror which radiates the small bundle of colored light rays 9 (Fig. 3). As this bundle of colored light rays is just as inadequate for illuminating the road as if the small auxiliary reflector 8 would scatter the colored light in cone-shape, it is endeavoured to utilize the large headlight reflector 4 to the best possible advantage for the colored light radiation without, however, thereby causing a mixing of the two kinds of light.

The auxiliary reflector 8 for this purpose is placed so that its edge and the edge of the colored bulb part 2 covering the apex of the bulb coincide with the circumference of the wall of a cone having as apex the center of the auxiliary filament 7, which cone intersects the headlight reflector 4 at a considerable distance from its edge so that a wide colored ray rim 11 passes on the outer zone of the headlight reflector 4, which reflects the far reaching colored dimmed light 12. On the other hand the auxiliary reflector 8 is so placed and of such size that the main incandescent filament as heretofore leaves the entire headlight reflector free for flooding with white light.

Both the colored calotte 2 and also the auxiliary reflector 8 are arranged only so near to the contour of the cone 10 that no yellow light can pass into the reflector when white light is being projected.

As the auxiliary filament 7 is not situated in the focus of the large reflector 4, a certain diffusion of colored light 12 occurs, which however is desirable to a certain extent in the case of dimmed light.

The construction of the socket 13 of the incandescent lamp with several contacts is itself known and moreover the arrangement of the feed and holding wires 14 and 16 for two or more incandescent filaments presents no difficulties. The small auxiliary reflector 8 is in the present instance made of conductive material. It is carried by a holder 15 and a short wire on its upper edge serves for connecting the auxiliary filament 7, which is fixed at its other end to a holder 16, which extends freely around the edge of the auxiliary reflector 8.

In the second form of construction illustrated in Figs. 4 to 6 the colored calotte 18 is not situated in the spherical surface of the bulb 19, but is inwardly bulged and provided with a mirror foil 26 on its outer side. In this manner a convex colored reflector is produced in the interior of the bulb. This convex reflector receives the light from the auxiliary filament 20 or from the auxiliary parabolic mirror 21. A transparent yellow zone 22 is also preferably provided on the end of the bulb surrounding the convex reflector 26. In this manner the large headlight reflector 24 receives a colored rim of rays 25 in its inner portion, which rim is reflected by the convex reflector 26. An outer colored rim 27 is projected from the auxiliary filament 20 through the transparent yellow zone 22 on to the edge of the headlight reflector 24 so that a greater utilization of the colored dimmed light is obtained than in the construction shown in Figs. 1 to 3.

Figure 8:
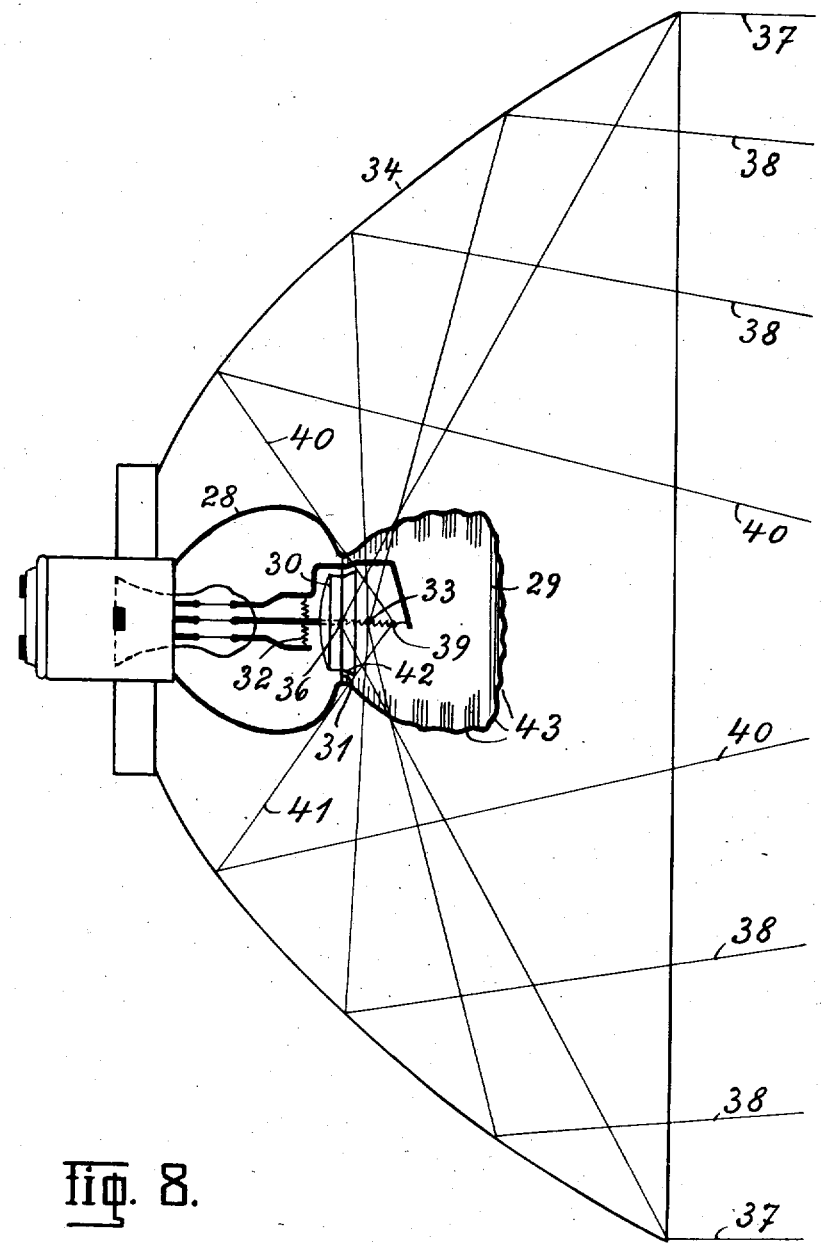

In the type of lamp constructed as double incandescent lamp and illustrated in Figs. 7 and 8, it is possible, whilst maintaining the complete separation of the white and colored lights, to arrange the auxiliary filament so near the focus of the headlight reflector that it can almost entirely flood same with light like the main filament. The headlight reflector therefore projects almost parallel colored or otherwise dimmed light on to the road. This light is far reaching and affords a clear view on dark roads, even when the headlight is dimmed.

In order to meet these requirements in a single stationary incandescent lamp, the spherical glass bulb is narrowed towards the auxiliary reflector 8 on the boundary line between the colored and white zones. This produces a known bulb with two united chambers 28 and 29, which accommodate the lighting system according to the invention in such a manner that the plate auxiliary reflector 30 lies on the boundary line 31 between the two chambers. The main and auxiliary filaments are situated very near to this auxiliary reflector 30. The main filament 32 lies in the focus of the headlight reflector 34 so that it can completely flood with light the headlight reflector up to its outer edge. Its former headlight effect remains unchanged (Fig. 7).

In order to attain a similar effect with the auxiliary filament 33, this is arranged perpendicularly to the auxiliary reflector 30. Both filaments are consequently only a few mms. apart, but, owing to the auxiliary reflector 30 and the narrowed portion of the double glass bulb, the separation of the white and colored or otherwise dimmed light is reliably ensured. Owing to the fact that the auxiliary filament 33 is situated a short distance outwards from the focus of the headlight reflector 34, a certain diffusion of the colored light occurs, but practical experiments have shown that a certain diffusion is even desirable, as otherwise dazzling would be produced by colored light with exclusively parallely directed rays. Moreover, the lateral light necessary for clear view of near objects would be lacking. Fig. 8 shows that the rays projected from the rear point 36 of the filament 33, as they are nearest to the focus of the headllight reflector, are projected as almost parallel rays 37 from the outer edge of the headlight reflector. The rays 38 projected from the center of the filament 33 are slightly more inclined and the rays 40 coming from the extreme outer point 39 are still more inclined.

Briefly, therefore, it has been found that only the relatively few rays 40 coming from the base of the headlight reflector 34 are considerably deflected; towards the outer edge, i. e. by far the greatest portion of the surface of the headlight reflector, the rays, for example 38 and 37 gradually become more parallel so that the desired strong and far reaching dimmed light is produced.

The main and auxiliary filaments 32 and 33 can evidently also be arranged in any other position or be of any other shape without departing from the scope of the invention.

In order to prevent all mixing of white and colored lights in the lamp above described, the auxiliary reflector 30 has a rim 42. When the main filament 32 is operative, the edge of the reflector 30 coincides with the contour of a cone 35 having as apex the center of the main filament, which cone intersects the outer edge of the main reflector 34, or passes slightly outside thereof. The boundary line 31 between the two chambers 28 and 29 also coincides with the contour of the cone 35 or is preferably slightly within same so that also the boundary rays 44 emanating from the outer points of the main filament, lying transversely to the lamp axis, likewise do not come within the range of the yellow portion 29 of the bulb.

However, when the auxiliary filament 33 (Fig. 8) is operative, the rim 42 of the auxiliary reflector prevents the mixing of white and yellow light in that the outer edge of the reflector rim 42 coincides with the contour of a cone 41, having as apex the outer extreme point 39 of the auxiliary filament 33, which cone intersects the reflector 34 at its base, whereas the boundary line 31 between the chambers 28 and 29 likewise coincides with the contour of this cone or is preferably slightly within same. It can be seen from Fig. 8, that only a narrow zone of the yellow portion 29 of the bulb near the narrowing 31 of the bulb is utilized. It is also possible to utilize the outer portion of the bulb for radiating into the headlight reflector 34. This yellow portion 29 of the bulb is provided with flutes 43 in known manner, which flutes break up the rays, or a likewise known mirror covering may be provided on the end of the bulb, which reflects the rays into the headlight reflector 34. It may be pointed out that it is particularly easy with the types of lamps described to project only the dimmed light on to the ground or the surface over which the vehicle is travelling, by making the corresponding lateral surfaces of the colored or dulled glass portions in closing the auxiliary filament opaque by applying suitable layers. Thus, also that section of the reflector remains ineffective, from which the rays might otherwise strike the eyes of an approaching driver or pedestrian when the lamp is dimmed. The beam of light projected from the main filament is thus not reduced, as the lateral screening is only used for the colored or dulled glass portion, which encloses the auxiliary incandescent filament.

It is evident that the types of lamps above described can be modified in various ways without departing from the scope of the invention.

I claim:

1. A vehicle headlight comprising in combination, a main reflector, a lamp bulb in said reflector formed of two chambers and having a dimmed outer portion and a clear inner portion, a main filament arranged in the clear portion of said bulb in the focus of said main reflector, an auxiliary filament in front of said main filament and positioned on the longitudinal axis of said bulb, and an auxiliary reflector between and in proximity to said two filaments and arranged on the border line between the two chambers, and adapted to allow said main filament to flood the whole of said main reflector with white light and allow said auxiliary filament to flood a portion of said main reflector with dimmed light, and to prevent white rays from being projected into said main reflector by said auxiliary filament and to prevent a mixing of the two kinds of light, said auxiliary filament being so located with respect to the auxiliary reflector and the dimmed portion of the lamp bulb as to have the light rays thereof pass only through the dimmed portion of the bulb.

2. A vehicle headlight as specified in claim 1, in which said auxiliary reflector is in the form of a plate and the auxiliary filament is arranged perpendicularly to the surface of the plate.

3. A vehicle headlight as specified in claim 1, in which said auxiliary reflector is in the form of a plate and is provided with a rim, the outer edge of the rim and the boundary line between the two chambers coinciding with the surface of an imaginary cone having as its apex the extreme outer point of the auxiliary filament and intersecting the base portion of the main reflector, and the edge of the auxiliary reflector and the boundary line between the two chambers lying in the surface of an imaginary cone having as its apex the center of the main filament and intersecting the outer edge of the main reflector.

WILLI ALBERS.